May 11, 1937.  C. A. HUENGER  2,080,274
CAMERA
Filed April 11, 1936  2 Sheets-Sheet 1

INVENTOR.
Clifton A. Huenger
BY *James R. McKnight*
ATTORNEY.

May 11, 1937.  C. A. HUENGER  2,080,274
CAMERA
Filed April 11, 1936   2 Sheets-Sheet 2
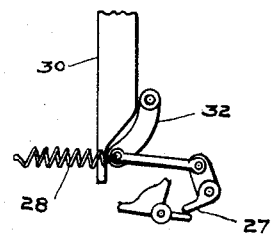
Fig. 4
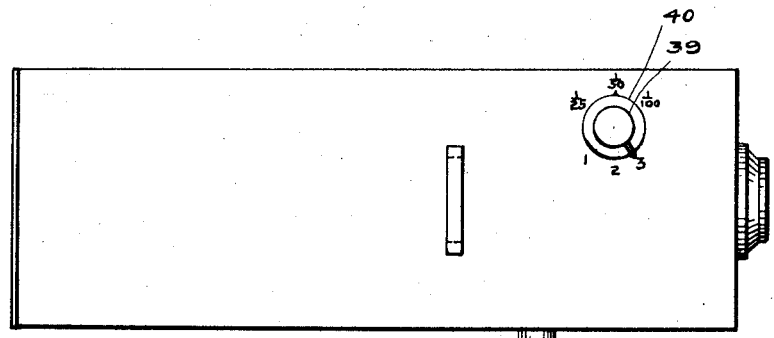
Fig. 5.   Fig. 7
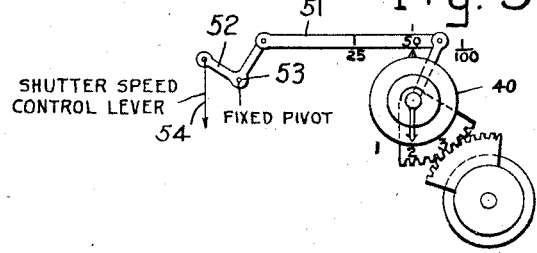
Fig. 6.
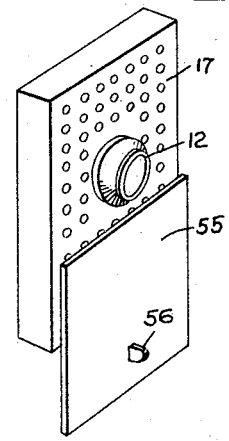
INVENTOR.
Clifton A. Huenger
BY James R. McKnight
ATTORNEY.

Patented May 11, 1937

2,080,274

UNITED STATES PATENT OFFICE 2,080,274

CAMERA

Clifton A. Huenger, Whiting, Ind., assignor to Walter E. Schrage, Whiting, Ind.

Application April 11, 1936, Serial No. 73,827

5 Claims. (Cl. 95—64)

My invention relates to a mechanical means, operable without dry cell batteries for automatically setting the iris diaphragm aperture of a camera for correct exposures.

Heretofore in the art only experts with considerable past knowledge and experience or those owning bulky, heavy and expensive equipment were able to obtain correct exposures. Existing automatic equipment requires dry cell batteries requiring much space and having considerable weight. These dry cell batteries naturally deteriorate with age and may, therefore, not be consistent in producing the result desired.

Among the objects of my invention, eliminating all of these present disadvantages, is to create a mechanical means for obtaining correct exposures which is so compact in size and light of weight as to fit within the average pocket sized casing of a camera; to provide such a structure without the need of dry cell batteries; to supply a strictly mechanical means for obtaining correct exposures in which the voltic type of photo-electric cell and a millivoltmeter are used; to create such a mechanism actuated by simple movement that will automatically set the camera aperture for correct exposure and to actuate the camera shutter; to create a device which by one simple manual act of a user will actuate both the exposure meter and the camera; to create a structure that has no parts that will deteriorate with age; to provide a structure accurate in its function and result which can be designed to suit the particular characteristics of the photo-electric cell used, and such other objects, advantages and capabilities as will later more fully appear and which are inherently possessed by my invention.

While I have shown in the accompanying drawings a preferred embodiment of my invention, yet I wish it understood that the same are susceptible of modification and change without departing from the spirit of my invention.

Figures 1, 2:
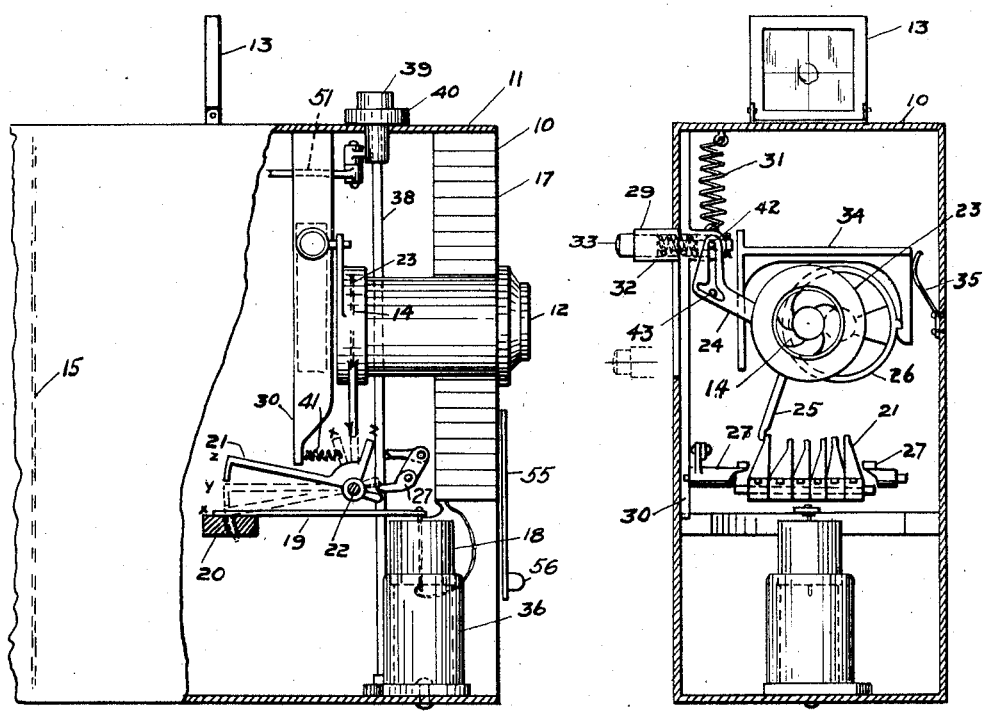
Figure 3:
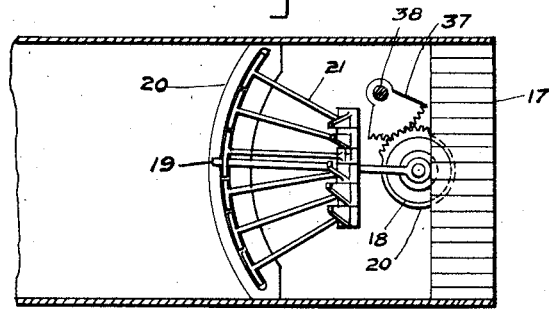

Referring more particularly to the drawings, Fig. 1 is a front view with the front portion of the casing of the camera cut away, and Fig. 2 is a side sectional view of my invention. Fig. 3 is a detailed view of the primary levers and the structure for adjustment to different film emulsion speeds; Fig. 4 is a detailed view of my secondary levers; Fig. 5 is a plan view of the camera and the structure for adjustment to different shutter speeds, and Fig. 6 is a detailed view of the compensating elements. Fig. 7 is a detail view of the control of the usable surface of the photo-electric cell.

Referring more particularly to the embodiment selected to illustrate my invention, the drawings disclose my invention as cooperating with a camera 10, having a casing 11, a lens 12, a view finder 13, an iris diaphragm aperture 14, film 15, and a shutter 26. In addition I also provide a light sensitive device such as a photo-electric cell 17, and a millivoltmeter 18. The millivoltmeter 18 has a needle 19, which is actuated by the electromotive force set up by the photo-electric cell, according to the intensity of the existing light condition. The needle 19 rotates in a plane parallel to the top surface of a slotted bar 20 with a comparatively small clearance between said needle and said slotted bar.

Preferably located above the needle 19 of the millivoltmeter 18 are a plurality of primary levers 21 mounted on a fixed shaft 22. These levers are shown in neutral position in solid lines in Fig. 2 as indicated by the letter Z. The other two positions that these levers may take are shown in Fig. 2 in dotted lines and indicated by the letters X and Y.

The iris diaphragm aperture 14 of the camera 10 is adjusted by a rotating movement of an outer shell 23 having two permanently fixed secondary levers 24 and 25. Any rotating movement of these levers about the axis of the lens 12 and aperture 14 will open or close the iris element of the aperture, thus admitting more or less light to the sensitized film 15 when the shutter 26 is open. Lever 25 rotates in a plane perpendicular to the axis of the aperture through the point Y. It is thus seen that the primary levers 21 will cause interference with the movement of the levers 25 when they are in the Y position. Positions X and Z are clear of all movement of lever 25. Weak springs 41 may be attached to primary levers 21 to retain them in the X position, but stronger means are provided to force them into Y and Z positions as hereinafter set forth.

My invention is best illustrated in use as follows: An object is sighted through the view finder 13. The mechanism of my structure is in neutral position at this time in that primary levers 21 are held in the Z position by the neutral lever 27 and spring 28 as clearly shown in detail in Figs. 2 and 4. It is apparent that the millivoltmeter needle is free to float over the bar 20 without interference. After the user has sighted his object and is ready to take the picture, the user moves the outward projection 29 of member 30 in a downward direction against the action of spring 31. Movement from point 42 to point 43 has no effect on the aperture. The downward movement of member 30 which at its lower end is a cam, raises cam lever 32 against the action of spring 28 thus rotating neutral lever 27 allowing the primary levers 21 to assume position X due to the tension of springs 41. All of these primary levers 21 will take position X, except that one of the primary levers that falls on the millivoltmeter needle 19. The millivoltmeter needle has, of course, positioned itself according to the intensity of existing light. This last mentioned lever is prevented from falling into the slot of bar 20 by the needle of the millivoltmeter and is held in position Y. Being in position Y, the said lever is in the path of rotation of lever 25 and causes interference. Continued downward movement of member 30 engages secondary lever 24 rotating secondary lever 25, accordingly closing the iris diaphragm aperture 14 until secondary lever 25 is stopped by the primary lever 21 in the Y position. The iris diaphragm aperture of the camera is thus automatically set according to existing light conditions. When the button 33 is pushed in, it moves sliding element 34 which releases the shutter 26 against the action of spring 35. In a motion picture camera, shutter 26 is directly connected to the spring motor driving mechanism that moves the film through the camera.

I have hereinbefore explained the fundamental operation of my invention as adapted to a camera having one shutter speed and using film of one emulsion speed. It is understood, of course, that my invention is not limited to these conditions but may be adapted to a camera having three shutter speeds and capable of using the three common types of film such as regular pan-chromatic, supersensitive panchromatic and colored film. My invention is also adapted to further diversification. I may provide that my millivoltmeter 18 may be mounted on a support 36 that is adapted to be rotated by a segmental gear 37 attached to a shaft 38 that passes through the top of the camera with a knob 39 attached to its upper extremity. Shaft 38 passes through another element 40 that has a link and lever 51 attached to its lower end. Lever 51 actuates the shutter 26 for different speeds. Knobs 39 and element 40 both have individual pointers attached and can be set independently of each other. As shown in Fig. 6 the shutter speeds of the camera are set by a rotating movement of knob 40 which imparts lever movement to the camera shutter speed control lever 54 through lever 51 actuating lever 52 on a fixed pivot 53 which controls shutter speed control lever 54 of the shutter.

It is apparent that any rotation of the millivoltmeter 18 will change the zero or index of the needle. Fig. 5 shows a plan view of the camera showing knob 39 that compensates for three different film emulsion speeds and element 40 for three different shutter speeds.

The following illustrative table shows settings for the combinations possible in the three unit compensation:

| Shutter speed (fraction of a second) | Film used | Setting number |
| --- | --- | --- |
| 1/50 | Regular panchromatic | 2 |
| 1/100 | Regular panchromatic | 1 |
| 1/25 | Regular panchromatic | 3 |
| 1/25 | Color film | 2 |
| 1/50 | Color film | 1 |
| 1/100 | Supersensitive panchromatic | 2 |
| 1/50 | Supersensitive panchromatic | 3 |

A greater number of combinations are, of course, possible with a greater number of adjustments which are also within my contemplation and are inherent in the spirit of my invention. Further modifications may be made of my invention by controlling by suitable means such as a sliding plate 55 moved by projection 56 as shown in Figs. 2 and 7 the usable surface of the photo-electric cell, so as to enlarge or diminish the area of said surface, to obtain further compensations in relation to the greater or less electromotive force thereby set up.

With the aid and reference to Fig. 5 which represents the mechanism of the compensation elements its feasibility becomes apparent as an example of the use of my structure and with particular reference to Fig. 6 let us assume that regular panchromatic film is being used at 1/50 of a second shutter speed. It is decided to use a shutter speed of 1/100 of a second. This will cut the amount of light admitted through the shutter in half. According to the table in order to compensate for half as much light, knob 39 should be set to point 1. What this does is to rotate the millivoltmeter in a counter clockwise direction so that a lower F number will be the result. In other words, twice as much light will be allowed by the aperture to compensate for cutting the time of the shutter in half.

This reasoning and the correctness of the table will be evident to anyone versed in the art.

Having thus described my invention, I claim:

1. In combination with a camera having an iris diaphragm aperture, means for automatically setting the iris diaphragm aperture of the camera for correct exposures comprising a photo-electric device, a millivoltmeter connected to said photo-electric device and having a needle, a slotted bar positioned adjacent said needle, said needle adapted to rotate in a plane parallel to and above the top surface of said slotted bar, a plurality of primary levers mounted on a fixed shaft and positioned above said needle and said slotted bar, secondary closure levers attached to the iris diaphragm aperture of the camera, said primary levers normally positioned in neutral and free from contact with said secondary levers, said millivoltmeter actuated by the electromotive force set up by said photo-electric device in accordance with the intensity of existing light to position said needle over said slotted bar so as to contact one of said primary levers and prevent the same from being dropped with the other primary levers into the slotted bar, said primary lever contacted adapted to stop rotative movement of said secondary closure levers and thus determine the extent said secondary levers will open or close the iris diaphragm aperture, and manually operable means instituting the operation of said automatic means.

2. In combination with a camera having an iris diaphragm aperture, an exposure meter adapted to fit within the casing of the camera comprising a photo-electric device, a millivoltmeter connected to said photo-electric device, said millivoltmeter having a needle, a slotted bar positioned adjacent said needle, said needle adapted to rotate in a plane parallel to and above the top surface of said slotted bar, a plurality of primary levers mounted on a fixed shaft and positioned above said needle and said slotted bar, secondary levers attached to the outer shell of the iris diaphragm aperture and adapted to rotate said outer shell to open or close the iris element of said aperture for the admission of more or less light to the sensitized film carried by the camera, neutral members attached to said primary levers for normally positioning them free from contact with said secondary levers, manually operable means for instituting the operation of the exposure meter, said means permitting said photo-electric cell to set up electro-motive force according to the intensity of the light reflected from the object to be photographed so as to position said needle of the millivoltmeter to contact and prevent one of the plurality of primary levers from dropping down into the slotted bar said primary lever so contacted and adapted to stop rotating movement of said secondary levers and to thus determine the extent said secondary levers will open or close the iris diaphragm aperture.

3. In combination with a camera having an iris diaphragm aperture, an exposure meter adapted to fit within the casing of the camera comprising a photo-electric device, a millivoltmeter connected to said photo-electric device, said millivoltmeter having a needle, a slotted bar positioned adjacent said needle, said needle adapted to rotate in a plane parallel to the top surface of and above said slotted bar, a plurality of primary levers mounted on a fixed shaft and positioned above said needle and said slotted bar, secondary levers attached to the outer shell of the iris diaphragm aperture and adapted to rotate said outer shell to open or close the iris element of said aperture for the admission of more or less light to the sensitized film carried by the camera, neutral members attached to said primary levers for normally positioning them free from contact with said secondary levers, manually operable means for instituting the operation of said aperture for a correct exposure, said millivoltmeter mounted on a support, a segmental gear geared to said support, a shaft connecting the segmental gear and the manual control means, said segmental gear adapted to rotate the support and properly position the millivoltmeter to compensate for a change in shutter speed or film emulsion speed and means attached to the shutter of the camera for actuating same.

4. In a camera having mechanical adjustment of the iris aperture controlled by the needle of a millivoltmeter that is actuated by the electromotive force set up by a photo-electric cell according to the intensity of existent light, said needle adapted to be rotated to a position determined by said electro-motive force so set up, a plurality of levers positioned on one side of the plane developed by the swinging millivoltmeter needle and a slotted bar on the opposite side of said plane, so that said plurality of members may drop into said slotted bar, said needle positioned by said electromotive force and located above the slotted bar and below the levers, said needle so located to contact only one of said levers and prevent said lever from dropping with the other levers into the slotted bar, said lever so upheld by the needle having a portion adapted to contact the adjusting element of the iris aperture, and means for rotating the adjusting element of the iris aperture until stopped by said portion of said upheld lever.

5. In a camera having mechanical adjustment of the iris aperture controlled by the needle of a millivoltmeter that is actuated by the electromotive force set up by a photo-electric cell according to the intensity of existent light, said needle adapted to be rotated to a position determined by said electro-motive force so set up, a plurality of levers positioned on one side of the plane developed by the swinging millivoltmeter needle and a slotted bar on the opposite side of said plane, so that said plurality of members may drop into said slotted bar, said needle positioned by said electromotive force and located above the slotted bar and below the levers, said needle so located to contact only one of said levers and prevent said lever from dropping with the other levers into the slotted bar, said lever so upheld by the needle having a portion adapted to contact the adjusting element of the iris aperture, and means for rotating the adjusting element of the iris aperture until stopped by said portion of said upheld lever, and means for rotating the millivoltmeter about the axis of its needle pivot changing its zero or index position to compensate for different camera shutter speeds and film emulsion speeds.

CLIFTON A. HUENGER.